L. KOKOVAI.
VEHICLE CHASSIS AND SPRING.
APPLICATION FILED OCT. 13, 1921.
1,417,256.
Patented May 23, 1922.
2 SHEETS—SHEET 1.
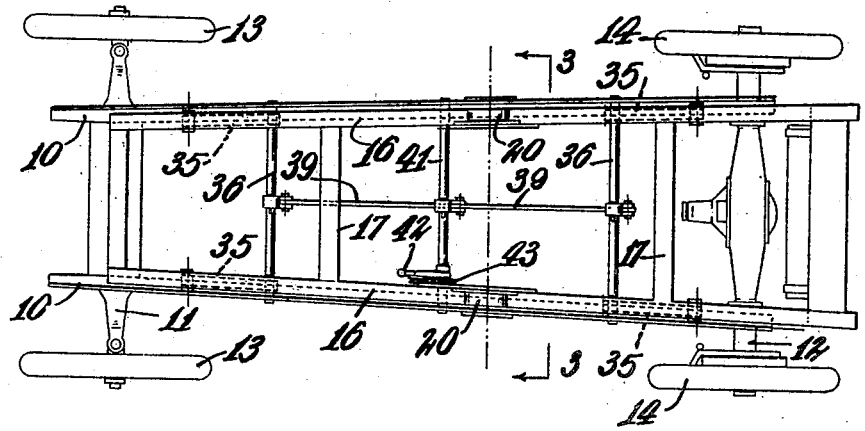
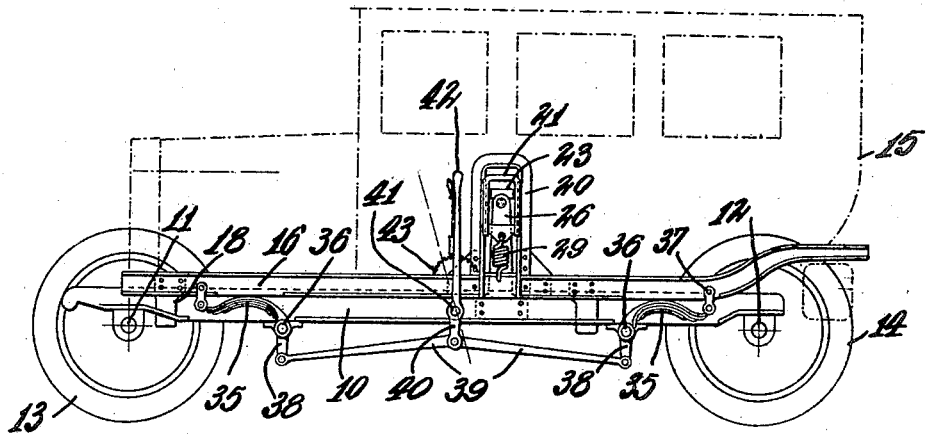
Inventor
Lawrence Kokovai
By Soltan S. Polachek
Attorney L. KOKOVAI.
VEHICLE CHASSIS AND SPRING.
APPLICATION FILED OCT. 13, 1921.
1,417,256.
Patented May 23, 1922.
2 SHEETS—SHEET 2.
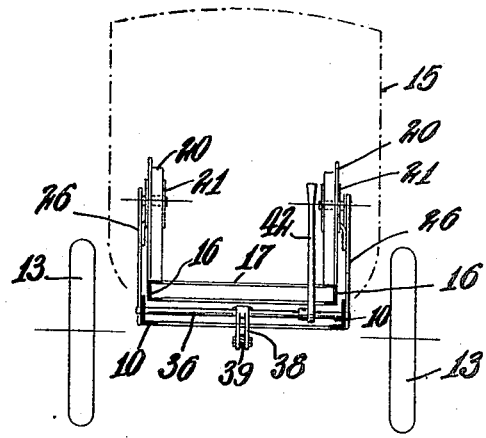
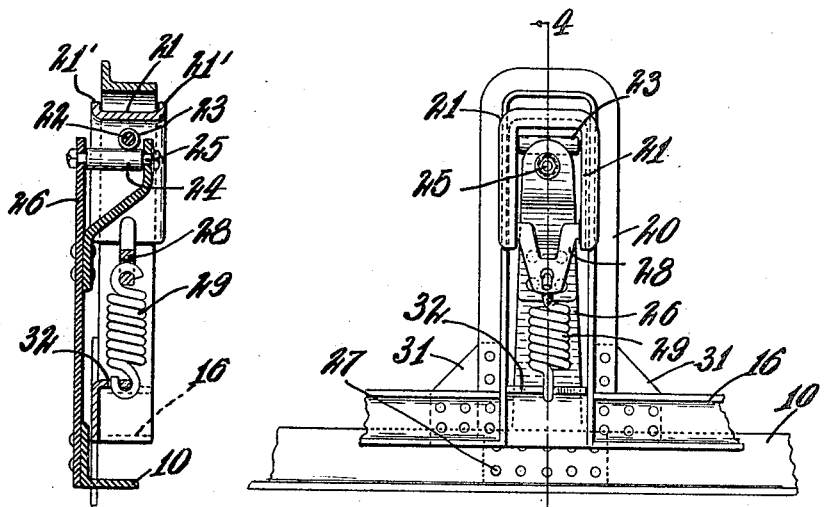
Inventor
Lawrence Kokovai
By
Attorney

UNITED STATES PATENT OFFICE.

LAWRENCE KOKOVAI, OF DANTE, VIRGINIA.

VEHICLE CHASSIS AND SPRING.

1,417,256.     Specification of Letters Patent.     Patented May 23, 1922.

Application filed October 13, 1921. Serial No. 507,582.

*To all whom it may concern:*

Be it known that I, LAWRENCE KOKOVAI, a citizen of the United States, residing at Dante, in the county of Russell and State of Virginia, have invented certain new and useful Improvements in Vehicle Chassis and Springs, of which the following is a specification.

This invention relates generally to automobiles, having more particular reference to the chassis construction relating to the resilient mounting of the body and power mechanism.

The invention has for an object to provide a novel and improved chassis construction which will lessen shocks and jars when rough roads are being traversed.

A further object of the invention is to provide a means for relatively varying the resistance of the front and rear springs as may be desired according to the disposition of the load.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of the chassis of an automobile having the invention applied thereto.

Fig. 2 is a side elevation thereof, the body of the automobile being shown in broken lines.

Fig. 3 is a transverse section on the line 3—3 of Fig. 1.

Fig. 4 is an enlarged detail transverse vertical section showing one of the resilient central supports for the automobile body, this view being taken on the line 4—4 of Fig. 5.

Fig. 5 is a side view of the said resilient central support.

In applying my invention to an automobile I form the chassis with a pair of side frame members 10, preferably consisting of angle beams, which are solidly secured to the front and rear axles, indicated at 11 and 12 respectively, without the intermediary of any springs. These axles are of usual construction, and the front wheels 13 and rear wheels 14 are respectively steered and driven by usual means.

To support the body, indicated at 15, of the automobile I provide a body frame comprising second pair of side frame members 16 which preferably consist of channel beams which, as shown in the drawings, are of slightly less transverse spacing than the angle beams and nest between the latter, and are rigidly secured to one another by transverse braces 17. The channel beams 16 are vertically guided by means of lugs 18 fixed thereto and depending therefrom and engaging in suitable openings in the horizontal flanges of the angle beams 10. The body and operating mechanism of the automobile may be fixed to these channel beams 16 in the usual manner.

The body frame 16, 17, is resiliently supported upon the angle beams 10 at three longitudinally spaced points, the supporting structure at the intermediate point being as follows: Fixed to and projecting upwardly from each of the channel beams 16 is a yoke frame 20 having vertical legs forming guides for an inverted U-shaped cross head member 21, this member having flanged edges 21' which embrace the legs of the yoke frame 20 for guiding purposes.

Extending between the legs of the crosshead 21 is a fixed pin 22 on which is freely mounted a sleeve roller 23. This roller 23 rests upon a second sleeve roller 24 which extends at right angles thereto and is mounted on a bolt 25 fixed in the forked upper end of a flat post 26 projecting up from the adjacent angle beam 10, the post 26 being here shown as secured to the angle beam 10 by rivets 27. As will be apparent the crossheads 21 are supported by the posts 26, while the arrangement of the pairs of rollers 23, 24 allows of limited side play of the parts.

The crossheads 21 are adapted to have the body frame 16, 17 suspended therefrom and to this end a crank bar 28 extends between the lower ends of the legs of each of the crossheads and is pivotally attached at its ends thereto. This crank bar 28 has attached thereto the upper end of a coiled tension spring 29 whose lower end is attached to the adjacent channel beam 16. The channel beam 16 is shown in Fig. 5 as formed in two sections united by a gusset plate riveted thereto and to the yoke frame 20 the gusset plate having a bent out flange 32 between the leg of the yoke frame 20 to which the lower end of the suspension spring 29 is attached.

The means for mounting the body frame at front and rear ends comprises the pairs of resilient arms 35 which are fixed on transverse rock-shafts 36 carried by the side frames 10. These arms 35 are connected at their free ends by links 37 to the side members 16 of the body frame. The rock-shafts 36 have downwardly projecting arms 38 to which are connected the ends of a pair of link bars 39, the opposite ends of these link bars being connected to the lower end of an arm 40 fixed to an intermediate transverse rock-shaft 41 carried by the side frames. To this rock-shaft 41 is fixed an upwardly extending operating lever 42, which may have usual locking means 43 for holding it in different positions.

In the event of a variation of the centre of load in a longitudinal direction lever 42 may be shifted, swinging the spring arms 35 in opposite directions and thus maintaining the level of the automobile body.

With my improved chassis the body is suspended in a manner to reduce shocks and jars and a very smooth running automobile results.

Having thus described my invention what I claim as new and desire to protect by Letters Patent of the United States is as follows:

1. In an automobile, running gear including frame members, resilient supporting devices for said body carried by said frame members at three longitudinally spaced points, and means for vertically adjusting the front and rear devices to maintain a horizontal positioning of said body upon variation of the longitudinal disposition of the weight carried by said body, said means being adapted to effect an opposite adjustment in unison of the front and rear device.

2. In an automobile, running gear including side frame members, a body frame resiliently mounted on said side frame members at three longitudinally spaced points, the front and rear resilient mounting means comprising resilient arms having the said body frame connected to their free ends and vertically rotatable members on which said arms are fixed.

3. In an automobile, running gear including side frame members, a body frame resiliently mounted on said side frame members at three longitudinally spaced points, the front and rear resilient mounting means comprising resilient arms having the said body frame connected to their free ends, rock shafts carried by the side frames to which said resilient arms are attached, and link and lever devices for rocking said shafts in unison.

4. In an automobile, running gear including side frame members, and a body frame resiliently mounted on said side frame members at three longitudinally spaced points, the intermediate mounting means comprising upstanding guide members fixed to the body frame, crosshead elements guided thereby, means supporting said crosshead elements on the said side frame members, and tension springs connected at opposite ends to said crosshead elements and body frame.

5. In an automobile, running gear including side frame members, posts projecting upwardly from said side frame members, a body frame, guide yokes fixed to and projecting upward from said body frame, crossheads guided in said yokes, rollers carried by said crossheads, rollers carried by said posts and extending transversely to and under the first rollers to support the said crossheads, and suspension springs connected to said crossheads and body frame.

In testimony whereof I have affixed my signature.

LAWRENCE KOKOVAI.